Jan. 19, 1971        D. M. BOYD        3,556,737
FLUID DISTRIBUTION FOR FLUID-SOLID CONTACTING CHAMBERS
Filed Dec. 20, 1968
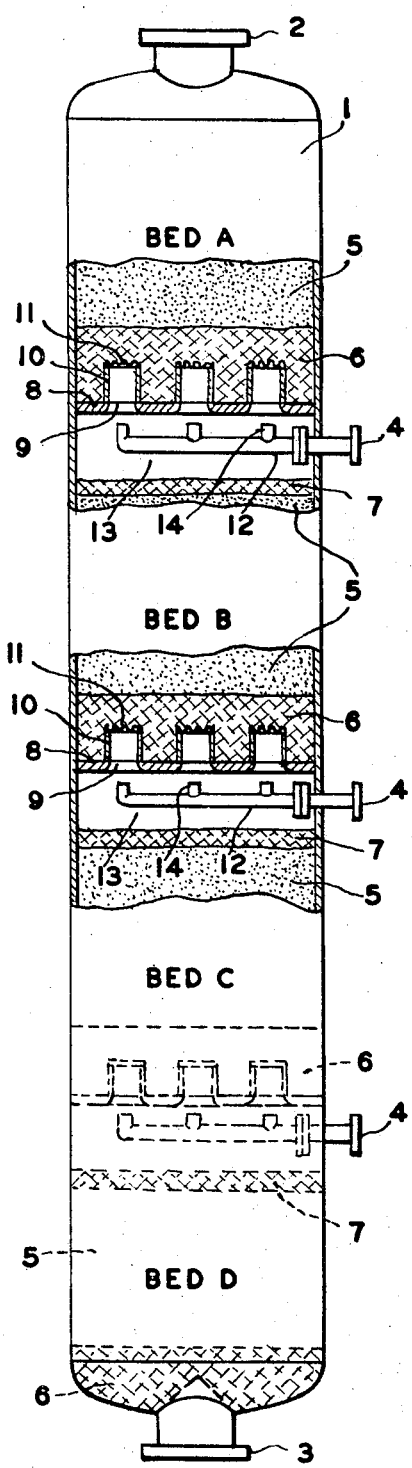
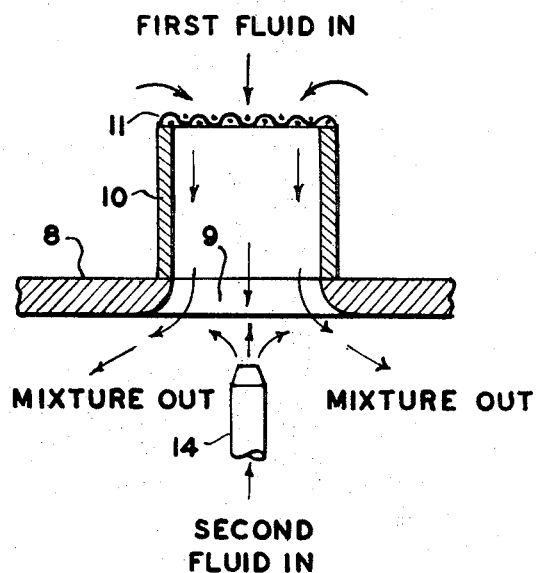
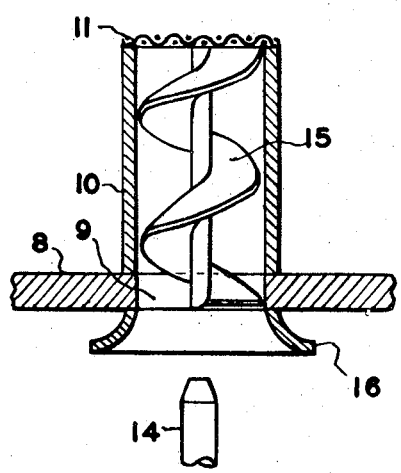
INVENTOR:
DAVID M. BOYD
BY: *James R. Hoatson, Jr.*
*Joseph E. Mason, Jr.*
ATTORNEYS United States Patent Office 3,556,737
Patented Jan. 19, 1971

3,556,737
FLUID DISTRIBUTION FOR FLUID-SOLID CONTACTING CHAMBERS
David M. Boyd, Clarendon Hills, Ill., assignor to Universal Oil Products Company, Des Plaines, Ill., a corporation of Delaware
Filed Dec. 20, 1968, Ser. No. 785,667
Int. Cl. B01j 9/02, 9/04
U.S. Cl. 23—288                                    12 Claims

ABSTRACT OF THE DISCLOSURE

An apparatus for contacting two fluids in a fluid-solids contacting zone, such as an adsorption zone or a reaction zone. A first fluid is discharged downwardly from a conduit spaced above a bed of particulated solids. From a nozzle spaced below the conduit, a second fluid is discharged upward into the first fluid discharge in a manner sufficient to produce a spray of mixed first and second fluid which passes into the bed below. Specific application is in hydrogenation, hydrotreating, hydrocracking, and hydrodealkylation reaction zones, wherein a hydrogen stream is utilized for the thermal quench of reactant hydrocarbon between catalyst beds.

BACKGROUND OF THE INVENTION

The present invention relates to an apparatus for contacting two fluids in a fluid-solids contacting zone such as an adsorption zone or a reaction zone. More particularly, the invention is directed to the contacting of two fluids comprising a liquid phase and a vapor phase in a fluid-solids contacting zone, and to means for effecting improved heat exchange between the vapor and liquid phases in the contacting vessel. More specifically, the invention relates to a new and improved apparatus for uniformly distributing mixed phases of vapor and liquid to a granular or particulated solids contacting zone, as in an adsorption tower or in a catalytic reactor such as a hydrogenation, hydrotreating, hydrocracking, or a hydrodealkylation reactor.

Among the most important of the various commercial processes are those involving the physical or chemical treatment of hydrocrabons and other organic materials with bodies of granular or particulated solid contact materials. Many of these processes involve the contacting of two fluids with the contacting material, and often the two fluids will comprise a liquid phase and a gas or vapor phase. It has been the experience in the art that the introduction of such mixtures of liquid and vapor into a bed of particulated contact solids in a uniformly distributed manner, is difficult to achieve.

Typical of the art wherein uniform distribution of liquid and gas phases is necessary but infrequently achieved, is that of catalytic hydrotreating and catalytic hydrocracking of various hydrocarbon oils. It is well known that the feed to such a reaction zone comprises liquid hydrocrabon, vaporized hydrocarbon, and a hydrogen-rich gas, and that this feed is introduced into the reaction zone at an elevated temperature. It is further known that the reactions which are encountered in this catalytic environment are exothermic, and that the temperature of the vapor phase and of the liquid hydrocarbon phase is increased due to the exothermic heat of reaction. In order to avoid excessive temperature within the catalyst bed it is, therefore, typical to arrange the catalyst bed in a plurality of separate fixed beds so that diluent or quench vapors may be distributed between the beds during the reaction. The cool quench vapors, normally comprising hydrogen-rich gas, reduce the temperature of the effluent from the bed above before the liquid-vapor mixture of hydrocarbon and hydrogen is fed into the bed of catalyst below.

It is typical in the art to support each individual bed of catalyst upon a perforated support plate. It is also typical in the art to introduce the quench hydrogen between the fixed beds of catalyst by means of a perforated pipe grid or other means which is positioned throughout the cross-section of the reactor vessel at the quench point. The effluent from the catalyst bed above, thus rains down from the perforated support plate throughout the cross-sectional area of the reactor while the quench hydrogen is distributed by the perforated grid distributor throughout the cross-sectional area of the reactor.

This prior art type of fluid distributing apparatus comprising a perforated catalyst support plate and a hydrogen quench grid distributor is utilized with the intent of achieving a complete distrbution of liquid and gas phases as uniformly as possible throughout the cross-sectional area of the reactor vessel and of the catalyst bed below. It is also the purpose of this known fluid distributing apparatus to provide an intimate contact between hot effluent from the bed above and cool quench in order to achieve a uniform temperature of the constituents that pass into the bed below.

However, this typical prior art design has proven to be relatively ineffective in accomplishing these objectives. The problem is complicated by the fact that it is normal to add a relatively small amount of cool quench hydrogen to a large quantity of hot effluent hydrocarbon and hydrogen which is leaving the bed above at an elevated temperature. The problem is additionally complicated by the fact that the amount of cold quench material is relatively small in relation to the large cross-sectional area which must be covered in order to maintain a proper uniform distribution of liquid and vapor to the bed of catalyst below.

The problem is further complicated by the fact that there is a mixed-phase condition within the reactor itself. There is evidence that the heavier viscous liquids tend to channel down the side of the reactor whereas the less viscous liquids tend to channel in the central region of the catalyst bed with the vaporized hydrocarbon and hydrogen. The result is that the temperature encountered within the catalyst bed will be quite uneven and localized undesirable hot spots are often found in each bed. It is well known by those skilled in the art that the existence of the hot spots within the catalyst bed leads to indiscriminant or non-selective hydrocracking of the hydrocarbon constituents, which is an undesirable result.

Since the more viscous liquid tends to rain down through the support plate near the walls of the reactor, these viscous materials will also continue to channel along the walls in the beds below. This results in an ineffective quench between the beds, and the resulting continuation of liquid channeling produces further danger of localized hot spots in the lower catalyst beds.

SUMMARY OF THE INVENTION

It is, therefore, an object of the present invention to provide an improved apparatus for contacting two fluids in a fluid-solids contacting zone such as an adsorption zone or a reaction zone. It is another object of this invention to provide an improved apparatus for contacting and distributing mixed phases of vapor and liquid in such contacting zones. It is a further object of this invention to provide a fluid distribution means whereby greatly improved mixture of vapor and liquid phases occurs at their point of introduction into a solid contacting zone. It is a still further object of this invention to provide a means of improved heat exchange between a liquid phase and a vapor phase passing to a fluid-solids contacting zone where the vapor and liquid are at different temperatures, so that the liquid and vapor mixture enters the subsequent contacting zone at a substanially uniform temperature.

These and other objectives, and the advantages of the present invention will become more readily apparent as the invention is more fully set forth hereinafter.

In the present invention, these objectives are achieved by use of a novel catalyst support and effluent redistribution apparatus wherein there is incorporated a novel means for injecting the quench hydrogen into the effluent which passes from the catalyst bed above into the catalyst bed below.

One embodiment of the invention is clearly set forth in FIG. 1 where there is illustrated a partially cut-away elevational view of a typical hydrocracking reactor vessel containing a plurality of catalyst beds supported upon the inventive catalyst support and fluid redistribution apparatus. There is also provided FIG. 2 wherein there is illustrated in vertical section, the flow pattern which is achieved by the inventive method for providing improved thermal quench of the effluent as it passes through the catalyst support and fluid redistribution apparatus. Additionally, there is provided FIG. 3 wherein there is illustrated in vertical section, various modifications to the basic apparatus which comprises one embodiment of the present invention.

The combination fluid distributing deck and catalyst support apparatus of the present invention comprises an imperforate support plate in contradistinction to the typical prior art catalyst support device which employs a perforated plate. However, the imperforate plate is provided with a plurality of fluid openings through which the liquid and vapor effluent from the catalyst bed may be passed via a downcomer into an open space confined below the support plate and above the catalyst bed below. With each fluid opening and downcomer, there is associated a hydrogen quench nozzle which projects upwardly and terminates directly below the downcomer and the fluid opening of the support plate.

As the fluid effluent, comprising liquid and vapor phases, is discharged from the downcomer, the hydrogen quench is discharged up into the discharge stream and countercurrent thereto. As a result of pressure effects, the hot effluent discharged from the plate above, upon being met by the force of upflowing cool hydrogen, is forced outwardly in a lateral direction and is directly mixed with the quench hydrogen in a manner sufficient to result in a conical spray which then falls onto the surface of the catalyst bed below in a substantially uniformly distributed pattern and at a substantially uniform temperature.

In a broad embodiment, therefore, the present invention may be characterized as a method for contacting two fluids in a fluid-solids contacting zone which comprises, passing the first fluid downwardly through a first conduit means positioned above a bed of particulated solids and spaced apart therefrom; passing second fluid upwardly through a second conduit means terminating a finite distance below the first conduit means and a finite distance above the bed; discharging first fluid downwardly into the space confined between the first conduit means and the bed; discharging the second fluid upwardly into direct contact with the first fluid discharge, whereby a spray mixture of first and second fluid is produced; and passing the mixture of first and second fluid from the space into the bed below.

Additionally, the present invention may be characterized as a fluid distributing means which comprises in combination, an imperforate plate containing a plurality of openings spaced over the facial area of the plate; fluid downcomer means extending from each of the openings to a distance from the plate; fluid inlet means below the plate projecting upward and terminating a finite distance directly under each of the downcomer means; and means for supplying fluid to each of the fluid inlet means.

In addition, the invention may be further characterized as a fluid-solids contacting chamber containing a plurality of fixed beds of particulated solids which comprises, a vertically elongated confined chamber having a least one upper fluid port and one lower fluid port to provide for a generally vertical flow of fluid therethrough; a plurality of spaced horizontally positioned imperforate support plate members holding and retaining particulated contact solids in a plurality of separate superimposed packed beds; a plurality of fluid openings spaced over the horizontal area of each support plate member; a fluid downcomer means extending from each of the openings to a distance from the plate; fluid inlet means below the plate projecting upward and terminating a finite distance below each of the downcomer means; and means for supplying fluid to each of the fluid inlet means.

Finally, it may be noted that a preferred embodiment of this invention may be characterized as the first of the three embodiments noted hereinabove wherein the first fluid discharged downwardly comprises a liquid phase and the second fluid discharged upwardly comprises a vapor phase.

A clear understanding of the present invention may now be obtained by referring to the accompanying figures wherein:

FIG. 1 shows a partially cut-away elevational view of a typical hydrocracking reactor vessel containing the inventive fluid distributing means.

FIG. 2 is a vertical section showing one portion of the inventive fluid distribution deck.

FIG. 3 shows another embodiment, in vertical section, of a portion of the inventive fluid distribution deck.

DESCRIPTION OF FIG. 1

As noted hereinabove, one application wherein the present invention finds specific utility is in the art of hydrocracking hydrocarbon constituents in a catalytic reaction zone.

FIG. 1 indicates a partially cut-away elevational view of a typical hydrocracking reactor vessel wherein there is contained four stationary or fixed beds of hydrocracking catalyst, beds A through D. The reactor vessel comprises a vertically elongated contacting chamber 1, with a fluid inlet port 2 located on the top of the vessel and a fluid outlet port 3 located on the bottom of the vessel. Additionally, the reactor vessel contains hydrogen quench inlet ports 4 below each of the first three catalyst beds, beds A through C.

Each catalyst bed comprises a bed of randomly packed granulated or particulated catalyst solids 5. The hydrocracking catalyst comprising each bed of particulated particles 5 can be any type of catalyst known in the art, and will typically comprise a catalyst in pilled, spherical, or extruded form. Each catalyst bed is supported upon a layer of unreactive or inert particulated support material 6. This support material may be any of the well known prior art inert support materials such as ceramic balls, Raschig rings, or Berl saddles. The top of each bed of catalyst contains an additional layer 7 of the same type of inert support material. As is well known to those skilled in the art, it is normal to provide such a layer of inert material 7 in order to afford improved distribution for the reactants raining down from the bed above before these reactants reach the active catalyst particles 5. In addition, the inert support material 7 provides a layer of high density material sufficient to keep the bed of lower density catalyst particles 5 securely in place under conditions of pressure surge which would otherwise dislocate the catalyst particles.

Each bed of catalyst comprising catalyst particles 5, inert support material 6, and covering layer of inert material 7, is retained and supported upon the fluid distribution deck of the present invention. The inventive distribution deck comprises an imperforate support plate 8 in which there is contained a plurality of fluid openings 9. These fluid openings are spaced over the facial area of plate 8 in a substantially uniform distribution. Associated with each fluid opening there is provided a fluid downcomer 10 of preferably cylindrical shape which rises above the support plate to a finite distance. By means of the elevated downcomers 10, it is virtually guaranteed that the liquid fraction of the effluent which channels or otherwise flows down from the catalyst bed above will be redistributed and at least to some extent intermixed by being accumulated in a reservoir of liquid upon the imperforate support plate 8 before the liquid can overflow and pass downwardly through the downcomer 10. Associated with each downcomer 10 there is provided a perforated means 11. Perforated means 11 may be a woven screen, a slotted plate, a perforated cap device, or any other means for allowing flow of fluid therethrough, while obstructing passage of particulated solid material.

As may be seen in FIG. 1, each fluid distribution deck comprising the elements noted hereinabove is located a distance above and away from the catalyst bed below. This provides that there is a confined open space 13 between each catalyst bed. Into this open space there is projected from quench nozzle 4 a quench header 12 which can be any type of pipe or other conduit device. Directly under each fluid opening 9 there is located a quench nozzle 14 which projects upwardly from header 12 in a substantially axial vertical alignment with the associated fluid opening 9 and downcomer 10. Each quench nozzle 14 terminates a short distance below imperforate support plate 8 and the associated fluid opening 9.

In operation, the hydrocarbon and hydrogen feed is passed to the hydrocracking reactor vessel 1 via inlet port 2. The feed mixture comprising hydrocarbon liquid, hydrocarbon vapor, and hydrogen gas passes downflow through catalyst bed A. The liquid constitutents of the reacted effluent leaving bed A collect in a reservoir of liquid which is maintained on imperforate support plate 8. The liquid overflows downcomer 10, and passes downwardly with vaporized hydrocarbon and hydrogen gas at an elevated temperature. This elevated temperature comprises the feed temperature of the material as it entered the reactor vessel via inlet port 2, plus the exothermic heat of reaction which was absorbed in the reactants as the hydrocarbon was hydrocracked in catalyst bed A. As the effluent comprising liquid and vapor phases passes downflow through downcomer 10 and is discharged from fluid opening 9, cold hydrogen quench gas is jetted upward from quench nozzle 14 against the effluent discharge stream.

The downflowing fluid from bed A meets the upflowing quench hydrogen to produce a region of turbulence in which the hot effluent is totally intermixed with the cold quench hydrogen to produce a relatively homogenous mixture of hydrocarbon and hydrogen at a lower temperature. The mixture of effluent from bed A and quench hydrogen forms a fine spray of liquid hydrocarbon which then rains down upon catalyst bed B below in a substantially uniform pattern. The sprayed liquid thus passes into bed B without channelling, and in a relatively homogenous distribution with the vaporized hydrocarbon and hydrogen passing into bed B.

The reactants are further hydrocracked in catalyst bed B and the effluent comprising liquid and vapor phases which leaves bed B has an elevated temperature due to the exothermic heat of reaction which occurs due to the catalytic reaction with bed B. The effluent then passes through the inventive fluid distribution deck which supports bed B and is contacted with upflowing hydrogen quench in the manner which was described for catalyst bed A hereinabove. This sequence of catalytic reacting and quenching with cold hydrogen is repeated again on the bottom of catalyst bed C. The final reaction mixture of hydrocracked hydrocarbon constituents and unreacted hydrogen finally leaves catalyst bed D and the reactor vessel 1 via outlet port 3, and passes to separation processing for product recovery by techniques which are well known to those skilled in the art.

The effectiveness and the principle of operation for the inventive fluid distributing deck may now be more clearly understood by referring to the accompanying FIG. 2.

DESCRIPTION OF FIG. 2

FIG. 2 is a vertical section showing one portion of the inventive fluid distributing deck. FIG. 2 illustrates one fluid downcomer of cylindrical shape and one associated fluid quench nozzle in order that a clear understanding of the operating principles of the deck may be set forth.

In FIG. 2, there is shown the imperforate support plate 8 and fluid opening 9. Associated with this fluid opening is a downcomer 10 which rises above support plate 8 to a finite distance. On the top of downcomer 10 there is provided a perforated means 11 which may be a woven screen as noted previously hereinabove. Directly under fluid opening 9, there is located a fluid quench nozzle 14. It will be seen from FIG. 2 that quench nozzle 14 is in substantially axial vertical alignment with downcomer 10 and fluid opening 9. In addition, it will be seen that quench nozzle 14 is located a finite distance below imperforate support plate 8 and below fluid opening 9.

In operation of the inventive distributing deck, a first fluid passes downflow via downcomer 10 and is discharged via opening 9 while a second fluid passes upward via quench nozzle 14 and is discharged directly into the discharging first fluid. The resulting impingement of second fluid against the flow of the discharging first fluid produces a region of turbulence whereby first and second fluid thoroughly intermix and the resulting mixture is forced outward laterally, typically in a conical spray configuration.

In the particular embodiment which has been set forth hereinabove in discussing FIG. 1, the first fluid comprises liquid hydrocarbon, vaporized hydrocarbon and hydrogen gas. The liquid hydrocarbon constituents of the first fluid accumulate upon imperforate support plate 8 and overflow through the perforated screen device 11 to pass downflow through downcomer 10. In addition, the vapor comprising hydrocarbon constituents and hydrogen flows through perforated means 11 with the overflowing liquid constituents of the first fluid. As the mixture of liquid and vapor passes downwardly through downcomer 10, it is well known by those skilled in the art that the liquid phase will tend to hug the downcomer walls while the vapor phase will flow downwardly through the central region of the downcomer. The result is that there is experienced within downcomer 10, a substantially annular flow of liquid along the surfaces of the downcomer 10.

As the first fluid is discharged downwardly from downcomer 10 via fluid opening 9, it is well known by those skilled in the art that by the Coanda effect the first fluid will tend to spread out in a spray like pattern due to the sudden drop in pressure. In order to enhance the spray effect, support plate 8 has edges around fluid opening 9 which are rounded in the manner shown. However, the degree of spread of the spray of fluid is limited by the vacuum which is created in the center of the spray pattern, such as in the center of fluid opening 9, as the fluid spreads out. By discharging the second fluid comprising quench hydrogen upward into the center of the discharging first fluid comprising liquid hydrocarbons and vaporized hydrocarbon and hydrogen, the second fluid comprising quench hydrogen not only overcomes the slight vacuum contained in the center of the first fluid discharge, but it also produces a pressure increase. The result is that the discharging first fluid from opening 9 is thoroughly intermixed with the discharging hydrogen quench and the mixture is thrown out laterally with a greater force and to a greater distance than would otherwise be experienced if the second fluid were not impinged into the first fluid discharge in this manner.

The result is that in the typical hydrocracking reactor vessel the effluent leaving each catalyst bed is thoroughly intermixed with cool quench hydrogen resulting in a proper degree of temperature decrease before the total mixture passes into the catalyst bed below. In addition, it will be seen that the liquid constituents of the effluent channelling down from the bed above become thoroughly intermixed and uniformly discharged before passing into the catalyst bed below, so that any localized channelling which occurs in the catalyst bed above is not repeated in the beds below. It will also be seen that since the material discharged from fluid opening 9 is passed downwardly in a spray pattern, the entire cross-sectional area of the catalyst bed below may be covered by locating the plurality of fluid openings 9 and the associated quench nozzles 14 in a substantially uniform pattern over the face area of imperforate support plate 8.

Other embodiments of the present invention may now be ascertained by referring to the accompanying FIG. 3.

DESCRIPTION OF FIG. 3

FIG. 3 illustrates in vertical section a portion of the fluid distribution deck wherein there is again shown the imperforate support plate 8 and fluid opening 9. A cylindrical downcomer 10 extends from fluid opening 9 and rises to a finite distance above deck 8. On the top of the downcomer 10 there is provided the perforate means 11 for passing fluid into downcomer 10 while retaining particulated solids in the bed above. Directly under fluid opening 9 and in substantially vertical axial alignment with downcomer 10 and fluid opening 9, there is provided a quench nozzle 14.

In addition, in this embodiment of the inventive apparatus there is also provided a helical insert 15 within downcomer 10. This insert provides a helical path for the downflowing first fluid so that, in particular, the liquid constitutents of the first fluid are imparted with a centrifugal force when they are discharged from fluid opening 9. The centrifugal force will assist in discharging the first fluid outwardly to a greater lateral distance than might otherwise be experienced. While helical insert 15 is shown to be a single helix in the illustrated embodiment, insert 15 would preferably be a multiple helical device since otherwise the material being discharged from fluid opening 9 via the helix would be jetted outwardly in a single path in a single direction. By providing a triple helix, for example, the fluid would be discharged from fluid opening 9 in three paths spaced at 120° apart. Where a quadruple helix is employed, the first fluid would be discharged from fluid opening 9 in four centrifugal paths spaced 90° apart.

It will also be seen in FIG. 3 that there can be provided a flared skirt 16. This flared skirt enhances the Coanda effect noted hereinabove so that the fluid is given a greater flow path in order to enhance the spreading out effect which is experienced as the fluid leaves opening 9.

PREFERRED EMBODIMENTS

The manner of operation of the inventive fluid distributing means is readily ascertainable to those skilled in the art from the teachings that have been presented hereinabove, and the advantages to be accrued from the inventive device are equally apparent.

It must be realized, however, that the effectiveness of the device will depend upon the specific environment in which it is utilized, and in the specific dimensional design of the deck as it is specifically employed.

The dimensions for the inventive distributor deck and its elements cannot be set forth herein with great specificity since a great many factors will affect the dimensions which are required in any specific environment. Among the factors to consider in a hydrocracking reactor, for example, are the rate of flow of the effluent from the catalyst bed above to the bed below, and the rate of flow of the quench hydrogen. The vapor-liquid distribution of the effluent flowing from the bed above will also effect the dimensions which are required in the design of the inventive distributor deck, and the temperature and pressure of the effluent will have a pronounced effect upon this vapor-liquid distribution. In addition, it must be realized that the temperature at which the quench hydrogen is introduced via nozzle 14 will also have a pronounced effect on the degree of quench which is experienced and on the spray effect which is produced. Finally, molecular weights must be considered, and the density of the various liquid and vapor phases is of primary consideration.

However, for purposes of illustration it may be set forth that the typical downcomer 10 will extend at least two inches above the imperforate support plate 8 and fluid opening 9 and that in many applications the downcomer height will be more than two inches. Normally, downcomer 10 will have a circular cross-section with a preferred diameter of about four inches but in specific applications downcomer 10 and fluid opening 9 may have diameters from ½ inch to eight inches or more in range. The distance of nozzle 14 from fluid opening 9 and downcomer 10 will depend to some extent upon the diameter of downcomer 10 and fluid opening 9 as well as the other considerations noted in the paragraph above, such as temperature and flow rate. Thus, the distance of nozzle 14 from fluid opening 9 could be varied in the range of from a fraction of an inch to twelve inches.

It will be apparent to those skilled in the art that the number of fluid openings which are provided in imperforate support plate 8 will vary with the specific application. However, there should be a sufficient number of fluid openings substantially uniformly distributed on support plate 8 so that the cross-sectional area of the top of the catalyst bed below is thoroughly contacted with the spray of effluent hydrocarbon and quench hydrogen in a substantially uniform manner. Thus, the number of fluid openings 9 in support plate 8 could range from four to one hundred or even more. Primarily, the pressure drop across the fluid distribution deck of the present invention must be considered in establishing the number of fluid openings. Since it is normal to seek a low pressure drop, at least six openings per deck should be provided in any typical hydrocracking operation.

It will also be apparent to those skilled in the art that the spacing of the fluid openings 9 and associated downcomers 10 over the facial area of imperforate support plate 8 will vary with the specific application and with the number of fluid openings incorporated in the inventive fluid distribution deck. Thus, in a very small fluid-solids contacting chamber wherein only a single downcomer and associated quench nozzle is necessary, the fluid opening will be positioned in the center of the circular plate. Where four openings are required, they will typically be spaced equidistant away from the center on radii at 90° from each other, in order to fully distribute the spray in a substantially uniform manner over the circular cross-section of the particulated solids bed below. Where seven openings are required, they may be positioned with one opening in the center of the circular support plate, and the other six openings spaced away equidistant from the center on radii at 60° from each other. Where a great many fluid openings are required in a large chamber, for example ten or more, the fluid openings may be spaced over the face of the imperforate support plate in concentric circles, in a square pitch distribution, in a triangular pitch distribution, or in any other pattern sufficient to provide a substantially uniform pattern of spray over the cross-section of the bed below.

It will be noted that in the application above the specific example comprises an illustration wherein a hydrocarbon was catalytically hydrocracked. It is well known to those skilled in the art that the catalyst will deteriorate as the operation proceeds so that catalyst activity and selectivity gradually becomes lower during the life of the catalyst. This then requires that the inlet temperature of the fluid entering via inlet port 2 be gradually increased over the life of the catalyst. This increase of temperature will cause a change in the vapor-liquid equilibrium of the effluent which is discharged from any given catalyst bed, thus causing a change in the hydraulics of the fluid distributing deck. In order to compensate for this change so that the spray pattern of the inventive fluid distribution apparatus is not lost, those skilled in the art will perceive that the temperature of the quench hydrogen can be changed or that the rate of the quench hydrogen can be changed sufficiently so that the hydraulic balance necessary for the most effective operation of the inventive distributor deck will remain in substantial equilibrium through the life of the catalyst.

While the embodiments disclosed hereinabove have been directed to the catalytic reaction of hydrocarbons in a hydrogen atmosphere, the invention is not so limited. Those skilled in the art will perceive that the method of contacting two fluids in a fluid-solids contacting zone and the apparatus therefor have equal application in any fluid-solids contacting zone such as in absorption zones. Additionally, the apparatus is not limited to the support of fixed beds of particulated contact solids, but it can also find application as the feed distribution apparatus at the top of the first bed contained within the contacting chamber. The method and apparatus also is not limited to the specific fluids discussed hereinabove. Thus, the first fluid passed downwardly need not be a mixture of liquid and vapor phases, but it also could be solely a liquid phase, or solely a vapor phase. And the second fluid passed upwardly need not be limited to a gas or vapor phase, but it also could be solely a liquid phase, or a mixture of liquid phase and gas phase. Additionally, the downcomer means need not have a circular cross-section and it could be associated with more than one fluid inlet nozzle 14. In such an embodiment, of course, the resulting spray mixture would not be a conical spray.

However, from the disclosure hereinabove, it will be readily apparent that the particularly preferred embodiment of the present invention comprises application of the inventive apparatus and contacting method wherein the fluid-solids contacting chamber is a catalytic reaction zone for the processing of hydrocarbon costituents in the presence of hydrogen. Additionally, as noted hereinabove, specific application of the present invention is in hydrogenation, hydrotreating, hydrocracking, and hydrodealkylation reaction zones wherein a hydrogen stream is utilized for the thermal quench of reactant hydrocarbon between catalyst beds.

It will be apparent to those skilled in the art that in such preferred applications, the pressure wherein the inventive apparatus and contacting method are functional will be in the range of from 100 p.s.i.g. to 300 p.s.i.g. For example, in the hydrogenation of benzene to produce cyclohexane, a pressure range of from 100 p.s.i.g. to 500 p.s.i.g. is normally utilized. In the hydrotreating of light hydrocarbon fractions such as gasoline or naphtha to saturate olefins and to remove sulfur, nitrogen, oxygen, metallic, and other impurities, a pressure in the range of from 100 p.s.i.g. to 1000 p.s.i.g. is typically utilized. In the hydrotreating or hydrocracking of hydrocarbon fractions heavier than naphtha such as kerosines, gas oils, cycle oils, reduced crudes, etc., pressures in the range of from 100 p.s.i.g. to 3000 p.s.i.g. may be utilized. In the hydrodealkylation of alkylbenzenes to produce benzene, a pressure in the range of from 300 p.s.i.g. to 1000 p.s.i.g. is normally employed.

In addition, those skilled in the art will realize that for these processes the inventive apparatus and contacting method will be utilized at a temperature in the range of from 300° F. to 1500° F. For example, in the hydrogenation of benzene to produce cyclohexane, a temperature range of from 300° to 600° F. is normal. In the hydrotreating of light hydrocarbons such as gasoline or naphtha fractions, a temperature range of from 500° to 900° F. is typically utilized. In the hydrotreating or hydrocracking of hydrocarbon fractions heavier than naphtha, a temperature range of from 500° to 1000° F. may be employed. In the hydrodealkylation of alkylbenzenes to produce benzene, temperatures in the range of from 1000 to 1500° F. may be utilized.

In these hydrocarbon processes wherein the inventive apparatus and contacting method find particular utility, the beds of particulated or contact solids will normally comprise catalyst containing one or more metallic components selected from Group VI–B and Group VIII of the Periodic Table (Periodic Table, Handbook of Chemistry and Physics, 43d edition). These metallic components are typically supported on a refractory inorganic oxide having a pilled, spherical, or extruded form although any granular or particulated form may be employed. Typical support materials of this type are alumina silica, magnesia, zirconia, kieselguhr, diatomaceous earth, etc., either singly or in combination. A typical hydrogenation catalyst will comprise a Group VIII metal on the refractory inorganic oxide, and a preferred catalyst for hydrogenation of aromatic hydrocarbons comprises nickel on kieselguhr. A typical hydrotreating catalyst will contain silica and alumina and a Group VIII metal or a Group VI–B metal or a combination of metals thereof. One preferred hydrotreating catalyst comprises silica, alumina, nickel, molybdenum, and cobalt. A typical hydrocracking catalyst will contain at least one metallic component selected from the metals of Group VI–B and Group VIII such as platinum, palladium, nickel, or molybdenum and a composite of silica-alumina. A typical catalyst for the hydrodealkylation of alkyl aromatics will comprise a Group VI–B metal such as chromium, molybdenum, or tungsten on the refractory inorganic oxide support material and one particularly preferred catalyst comprises chromium oxide on silica-alumina.

In summary, therefore, a preferred embodiment of the present invention may be characterized as a method for contacting two fluids in a fluid-solids contacting zone which comprises, passing first fluid at a first temperature, downwardly through a first conduit means spaced above a bed of particulated solids and spaced apart therefrom; passing a second fluid at a second temperature below the first temperature, upwardly through a second conduit means terminating a finite distance below the first conduit means and a finite distance above the bed; discharging first fluid downwardly into a space confined between first conduit means and the bed; discharging the second fluid upwardly into direct contact with the first fluid discharge whereby a mixture of first and second fluid is produced having a third temperature intermediate to the first and second temperatures; and passing the mixture of first and second fluid from the space above into the bed below.

Further, a particularly preferred embodiment of the present invention may be characterized as a method in the paragraph immediately above wherein the contacting zone comprises a catalytic reaction zone, the first fluid comprises hydrocarbon, the second fluid comprises hydrogen, and the be dof particulated solids comprises one of the group consisting of a hydrogenation catalyst, a hydrotreating catalyst, a hydrocracking catalyst, and a hydrodealkylation catalyst.

The invention claimed:

1. A fluid distributing means which comprises in combination:
   (a) an imperforate plate containing a plurality of openings spaced over the facial area of said plate;

(b) fluid downcomer means extending from each of said openings to a finite distance from said plate;

(c) fluid inlet means below said plate, projecting upward and terminating a finite distance directly under each of said downcomer means; and (d) means for supplying fluid to said fluid inlet means.

2. The distributing means of claim 1 wherein said downcomer means extend upward from each of said openings to a finite elevation above said plate, and said fluid inlet means project upward and terminate a finite distance directly below each of said openings.

3. The distributing means of claim 1 wherein a single fluid inlet means is associated with each fluid downcomer means in a substantially axial vertical alignment.

4. The distributing means of claim 1 wherein each of said downcomer means contains a perforate means sufficient to permit fluid flow therethrough while obstructing flow of particulated solids.

5. The distributing means of claim 1 wherein said downcomer means contains means for conducting helical flow therethrough.

6. The distributing means of claim 1 wherein each of said openings has associated therewith a flared skirt on the underside of said plate.

7. A fluid-solids contacting chamber containing a plurality of fixed beds of particulate solids which comprises in combination:

(a) a vertically elongated confined chamber having at least one upper fluid port and one lower fluid port to provide for a generally vertical flow of fluid therethrough;

(b) a plurality of spaced horizontally positioned imperforate support plate members having a plurality of openings spaced over the horizontal face of each support plate member, holding and retaining particulated contact solids in a plurality of separate superimposed beds;

(c) a fluid downcomer means extending from each of said openings to a finite distance from said plate;

(d) fluid inlet means below said plate, projecting upward and terminating a finite distance below each of said downcomer means; and (e) means for supplying fluid to said fluid inlet means.

8. The chamber of claim 7 wherein said downcomer means extend upward from each of said openings to a finite elevation above said plate, and said fluid inlet means project upward and terminate a finite distance below each of said openings.

9. The chamber of claim 7 wherein a single fluid inlet means is associated with each downcomer means in a substantially axial vertical alignment.

10. The chamber of claim 7 wherein each of said downcomer means contains a perforate means sufficient to permit fluid flow therethrough while obstructing flow of particulated solids.

11. The chamber of claim 7 wherein each of said downcomer means contains means for conducting helical flow therethrough.

12. The chamber of claim 7 wherein each of said fluid openings has associated therewith a flared skirt on the underside of the associated support plate.

References Cited

UNITED STATES PATENTS

| | | | |
|---|---|---|---|
| 2,607,662 | 8/1952 | Huff | 23—288 |
| 2,632,692 | 3/1953 | Korin et al. | 23—288 |
| 2,646,391 | 7/1953 | Houdry | 23—288X |
| 2,729,548 | 1/1956 | Forkel | 23—284 |
| 2,863,931 | 12/1958 | Summers | 23—288X |
| 3,284,169 | 11/1966 | Tominaga et al. | 23—284 |
| 3,353,803 | 11/1967 | Wechselblatt et al. | 23—284UX |
| 3,378,349 | 4/1968 | Shirk | 23—288 |
| 3,455,658 | 7/1969 | Wilkinson | 23—288X |
| 3,498,755 | 3/1970 | Borre | 23—288 |
| 3,502,445 | 3/1970 | Ballard et al. | 23—288 |

MORRIS O. WOLK, Primary Examiner

B. S. RICHMAN, Assistant Examiner

U.S. Cl. X.R.

23—283, 284, 285; 208—108, 146; 261—97, 113, 114